United States Patent [19]

Grube

[11] Patent Number: 5,357,561
[45] Date of Patent: Oct. 18, 1994

[54] COMMUNICATION UNIT CONTROL FOR WIDE AREA COMMUNICATION SYSTEMS

[75] Inventor: Gary W. Grube, Palatine, Ill.

[73] Assignee: Motorola, Inc., Schaumburg, Ill.

[21] Appl. No.: 911,571

[22] Filed: Jul. 10, 1992

[51] Int. Cl.⁵ .................. H04M 11/00; H04Q 7/00
[52] U.S. Cl. .................. 379/60; 455/33.2; 455/33.1; 379/59
[58] Field of Search .......... 455/14, 15, 17, 33.1, 455/33.2, 33.4, 56.1, 54.1, 38.3; 379/57, 59, 60

[56] References Cited

U.S. PATENT DOCUMENTS

| | | | |
|---|---|---|---|
| 4,661,972 | 4/1987 | Kai | 379/57 |
| 4,700,374 | 10/1987 | Bini | 379/60 |
| 4,748,655 | 5/1988 | Thrower et al. | 379/60 |
| 4,775,999 | 10/1988 | Williams | 379/59 |
| 4,833,701 | 5/1989 | Comroe et al. | 379/60 |
| 4,833,702 | 5/1989 | Shitara et al. | 379/60 |
| 5,040,238 | 8/1991 | Comroe et al. | 455/33.4 |
| 5,109,400 | 4/1992 | Patsiokas et al. | 379/57 |
| 5,153,902 | 10/1992 | Buhl et al. | 379/57 |
| 5,179,374 | 1/1993 | Winger | 455/33.1 |

FOREIGN PATENT DOCUMENTS

0212761  3/1987  European Pat. Off. .

*Primary Examiner*—Curtis Kuntz
*Assistant Examiner*—Michael B. Chernoff
*Attorney, Agent, or Firm*—Pedro P. Hernandez

[57] ABSTRACT

The present invention allows for a communication device (136) which roams within a communication system (100), the ability of maintaining in contact with other communication units, even while the unit is away from its home sub-system. Communication system (100) comprises a wide area paging system which includes a wide area paging controller (184) which controls at least one local area paging controller (108, 182 and 156). When a communication unit is away from its home system, the home system sends out a page via the wide area paging system in order to locate the communication unit and direct the unit to a local sub-system which the unit can use to communicate with the calling unit.

13 Claims, 5 Drawing Sheets

COMMUNICATION UNIT CONTROL FOR WIDE AREA COMMUNICATION SYSTEMS

TECHNICAL FIELD

This invention relates generally to communication systems and more specifically to a method of controlling communication units which roam over wide area systems.

BACKGROUND

One of the major problems for radio communication systems providing wide area two-way data and/or voice communication coverage is how to allow for a communication unit operating in the system to roam freely between sub-systems which form the wide area system. For example, a 10 site simulcast radio frequency trunked system may be considered a wide area two-way system on a regional level. The problem with such systems is how to provide a way of allowing the communication unit which is part of the system the ability to roam freely so that it is always part of a larger composite wide area system (or communication network), thereby allowing a caller to be able to communicate with the communication unit at any time the communication unit is in range of the wide area system.

Present day solutions to the above problem include communication systems such as Coverage Plus ™ manufactured by Motorola, Inc. This system uses a registration process in which the roaming communications units use a "checking in" process on each communication network site as the communication unit moves from site to site. This "check-in" process occurs even if the communication unit is not communicating with other units.

In wide area systems, knowing the location of each of the communication units "ahead of time", before a call request that will involve these units occurs, helps speed up group calls that involve activating channel resources at many sites across the wide area system. Present day registration processes take a lot of time on the site control channel which has the effect of limiting the overall capacity of the local site. The overall effect on system capacity will depend on the number of roaming units and the frequency of operation the units are employing when moving from coverage area to coverage area (i.e., site to site registration "hand-offs"). Currently this is not a major problem with the current numbers of roaming units and the relatively large size of the coverage areas, since typically larger coverage areas see fewer hand-offs. However, as systems become more complex, and Coverage areas become smaller in size, system overhead delays will become a major problem for wide area systems.

In wide area trunked systems, communication units must find a site within their present coverage area by either scanning through a list of pre-programmed control channels or they must scan the entire trunking band for a "friendly" control channel that is broadcasting a "networking offered here" outbound signalling word (OSW). In other words, the communication unit must search for a control channel which is compatible with the communication unit. As one can quickly determine, acquiring access to a local site, while roaming into unknown coverage areas, in the manner discussed above, is extremely time consuming.

In comparison to wide area trunked systems, cellular telephone systems have relatively small cells and large numbers of communication unit users that only do individual oriented calls (i.e., mobile-to-land and land-to-mobile telephone calls). Given this, cellular systems do not use unit-to-site registration processes. Due to the relative low probability of an infrequent incoming land-to-mobile call, it is better for cellular systems to just send a unit respond signal over the control channel from every cell when incoming calls actually occur. Speed of call set ups is not of utmost criticality for these one unit phone calls. Therefore, the unit respond signals can go out constantly, over a period of several seconds, in order to determine if the communication unit is turned on and in communication range. Each cellular radio must scan the different system control channels as the unit moves from cell to cell.

In nation-wide satellite paging systems, although providing wide area coverage, these systems do not direct roaming communication units to local two-way systems. Also, these paging systems do not provide the pagers with local system availability information in order for the pagers to receive further information once they have been paged.

Finally, system to system roaming, like that implemented by Ameritech Inc. in their "Easy Roaming" scheme, use a roaming unit-to-system registration process as the communication unit enters a non-home system. In this system, the registration process sends a message back to the communication unit's home system so it knows where to forward future calls addressed to the unit, should someone try to reach the roaming unit at its normal home system number. One problem with this roaming arrangement is that calls can only be completed if the unit-to-location information is constantly known. This "back to the home system" registration process suffers when communication units are not able to reach the home system (e.g., RF noise, traffic, etc.). This type of registration process also tends to add a lot of control traffic overhead that may be unnecessary to the wide area system.

More importantly than all of the above mentioned problems is that neither cellular or trunked communication systems are not presently located everywhere, in order to allow communication units the freedom to roam over wide coverage areas. Presently, communication units are not constructed such that they can use either system type interchangeably. For example, today's cellular radios can't switch over to trunking when a cellular system is not available and a trunked system is, or vice versa. The problem has not been limited by the technology of a radio that has sufficient RF bandwidth to cover both services. The problem arises in that the roaming communication units can't decide which system to move to, even if they could, since the communication units do not know how to find these different types of systems quickly enough and they also do not know which one of the communication systems is "best" for their particular service needs at any given point in time (e.g., data, voice, etc.). This scenario will only worsen as newer small cell systems and other different types of communication systems emerge. With more different communication systems become available to effectuate a wide area communication system. As can be seen from the above discussion of prior art systems, a need exists for a way of controlling communication units which operate over wide areas encompassing more than one communication system.

SUMMARY OF THE INVENTION

Briefly, according to the invention, a communication system providing roaming capabilities to a communication device comprises a plurality of operatively interconnected sub-systems each having a defined coverage area and a wide area system having a coverage area which substantially overlaps the coverage areas formed by the plurality of communication subsystems. The wide area system communicates with communication devices which have roamed outside of their local communication sub-systems when messages are directed to them. The wide area system directs the roaming unit to an appropriate communication sub-system which allows for the communication device to receive the message.

DETAILED DESCRIPTION OF THE PREFERRED EMBODIMENT

Figure 1:
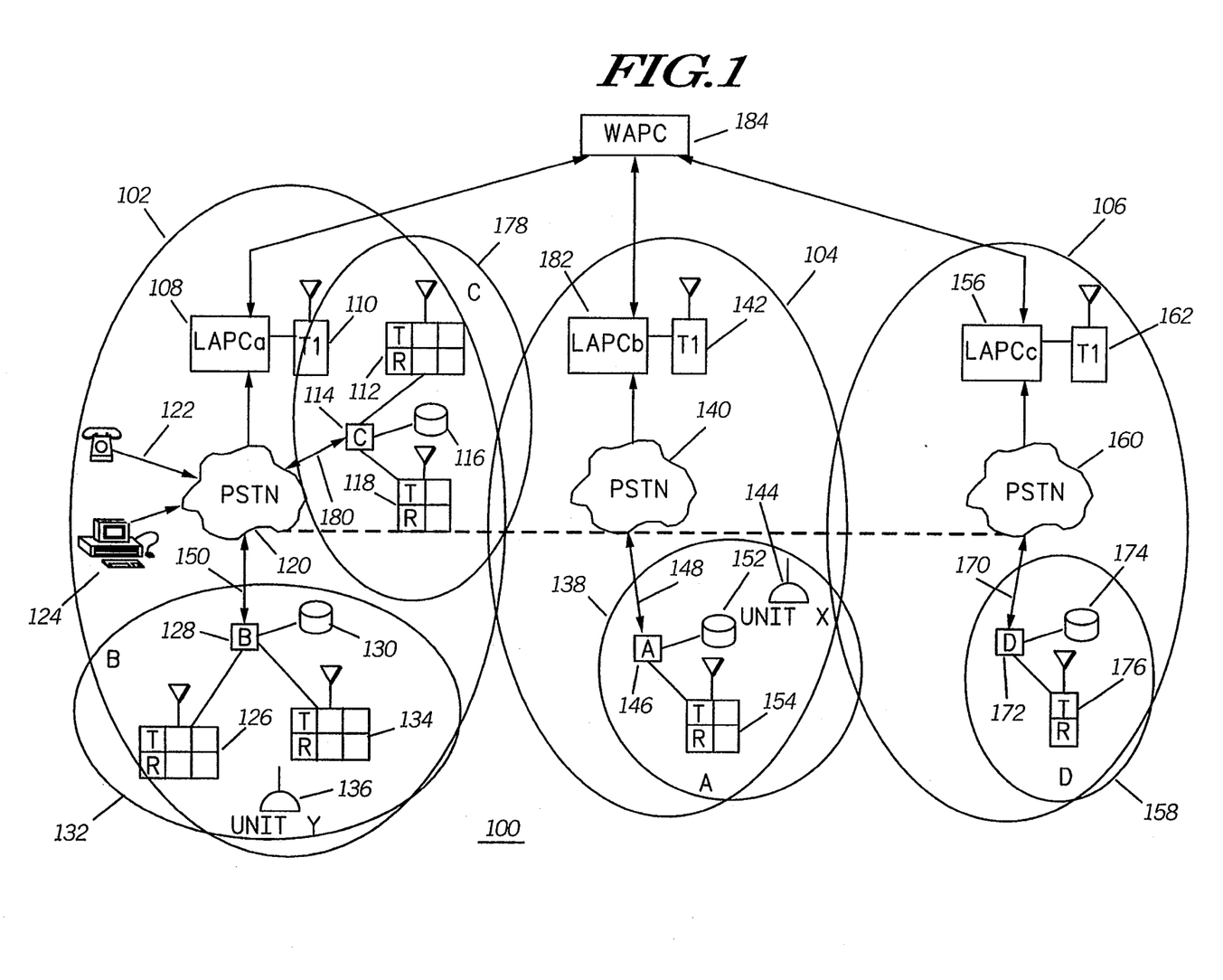
FIG. 1 is a diagram of a wide area communication system in accordance with the present invention.

Referring now to the drawings and in particular to FIG. 1, there is shown a radio communication system 100 in accordance with the present invention. System 100 comprises several two-way communications systems scattered about a wide area coverage area. The diagram shows the communication system comprising sub-systems "A" 138, "B" 132, "C" 178, and "D" 158. Each sub-system having defined communication coverage areas. In most wide area applications, the wide area system 100 will include hundreds of such communication systems. The communication systems 138, 132, 178 and 158 can be comprised of many different types of communication systems, e.g., trunked, cellular, ARDIS TM, etc. Each individual communication sub-system may have as few as one RF site or as many as the system type (e.g., trunking, etc.)can allow. For example, a trunking communication system may comprise a ten site simulcast regional system.

Each communication sub-system will typically include a sub-system controller such as system controllers 128, 146, 114, and 172 which are responsible for the coordination of their specific communication system. Coupled to each of the central controllers are data bases 116, 130, 152, 174 which store information relating to the units residing in the particular system and other system information. Each system controller is in turn coupled to the public switched telephone network (PSTN, shown as 120, 140 and 160) via appropriate communication links 150, 148, 170 and 180. As shown, each system controller may be in control of one or more communication sites (repeaters). For example, communication system "B" 132 is shown having two sites 126 and 134, system "C" 178 is shown having two sites 112 and 118, system "A" 138 is shown with one site 154, and system "D" 158 is shown having one site 176. Each site or repeater will include a receiver and transmitter as is well known in the art for relaying messages within their appropriate systems.

Each individual communication system 138, 132, 178 and 158 is interfaced to the Public Switched Telephone Network (PSTN) 120, 140 and 160 in order to provide a connection to the paging control system (discussed later) and to land parties that wish to connect to these radio equipped users. System 100 shows two such examples, where a telephone may be used to dial and converse with a target radio unit as shown by telephone 122 and communication unit Y 136 in system 132, or where a computer 124 may be used to dial and connect to a data equipped radio unit. In addition, mobile communication units may initiate a voice or data call and end up using the PSTN to connect to the intended target communication unit roaming on another system. Calling parties will "dial" into the home system where the target unit is normally associated and the present invention will take care of finding the roaming unit and linking the call. This process will be described in more detail later on as well.

Overlaying the entire geography of communication system 100 is a wide area system such as a multi-site same frequency paging system which will serve as a one way (outbound to the field unit) control channel for the communication system. The paging system is comprised of paging coverage areas 102, 104 and 106 which substantially overlap the coverage areas of communication sub-systems 138,132, 178 and 158. It is constructed with a single transmitter per site 110, 142 and 162, with sites arranged such as to provide a blanket of continuous coverage over the entire wide area service area. Each paging transmitter 110, 142 and 162 is supported by a Local Area Paging Coordinator (LAPC) 108, 182 and 156. The LAPCs job is to format the pages for transmission on its associated paging transmitter and to collect the page requests and other information from the two-way systems in its vicinity.

LAPCs 108, 182 and 156 will support two-way systems in the coverage area of its paging transmitter. While the paging transmitters are depicted as a single transmitter per region, it is also feasible to use multiple paging transmitters in a simulcast fashion to blanket a larger metro region more effectively. Also, instead of using a one-way paging system as described above, one could as easily employ a two-way communication system as the overlaping wide area system.

Each IAPC 108, 182 and 156 is interfaced to the PSTN as well, so that the two-way systems can connect to them in order to update the LAPCs with service availability information, and to locate roaming units when they can't be found in their home or local sub-system (systems 132, 138, etc.). The communication device's home sub-system can be either be the sub-system where the communicaiton device is usually located and where most calls to the device are generated, or the sub-system where the calling communication unit is using to locate the communication device. For example, unit X 144 may be attempting to locate unit Y 136 in sub-system 138, thereby making system "A" 138 the home sub-system for unit X 144. Each LAPC is also connected to a Wide Area Paging Coordinator (WAPC) 184 where all the page requests are distributed back out to all the LAPC's. This connection could either be via dedicated line, as shown, or over dial up circuits through the PSTN.

Unit Y 136 in System B 132, and a Unit X 144, in System A are included for examples which will be discussed later on, and in practice system 100 could support thousands of these radio units.

Figure 2:
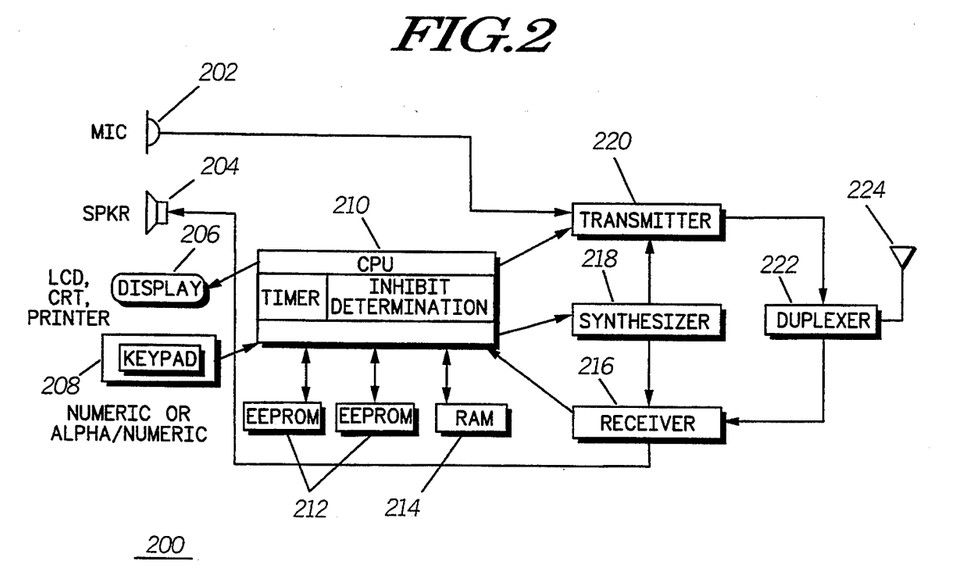
FIG. 2 is a block diagram of a communication unit in accordance with the present invention.

In FIG. 2, a block diagram of a roaming capable communication unit such as a radio 200 in accordance with the present invention is shown. Radio 200 includes a control means such as controller 210, which controls the overall operation of the radio. Controller 210 can be a microprocessor or microcontroller as known in the art. Controller also acts as a decoder means for decoding incoming messages and also determines if radio 200 is operating in its home system. Controller 210 further comprises appropriate control software for performing the overall radio funtions. One of such functions performed by controller 210 is a timer means function which produces a signal after radio 200 has been away from it's home sub-system for a predetermined period of time. The signal directs controller 210 to begin looking for a message from the paging system which will direct the radio to an appropriate communication sub-system. The functional aspects of radio 200 will be discussed in more detail later in the description.

Coupled to the controller 210 are electrically erasable read-only memories 212 and random access memory 214, which are used for storage of radio information. Also, coupled to the controller are a keypad 208 for user entry of information, a display 206, and speaker 204. Controller 210 is also coupled to synthesizer 218, transmitter 220 and receiver 216. A microphone 202 is coupled to transmitter 220. Duplexer 222 controls the flow of information between transmitter 220 and receiver 216 and antenna 224. Radio 200, should preferably have a wide band operation range for both the transmitter and receiver, in order for radio 200 to access multiple system types, such as trunking, cellular, as well as the system wide paging channel.

Figure 3:
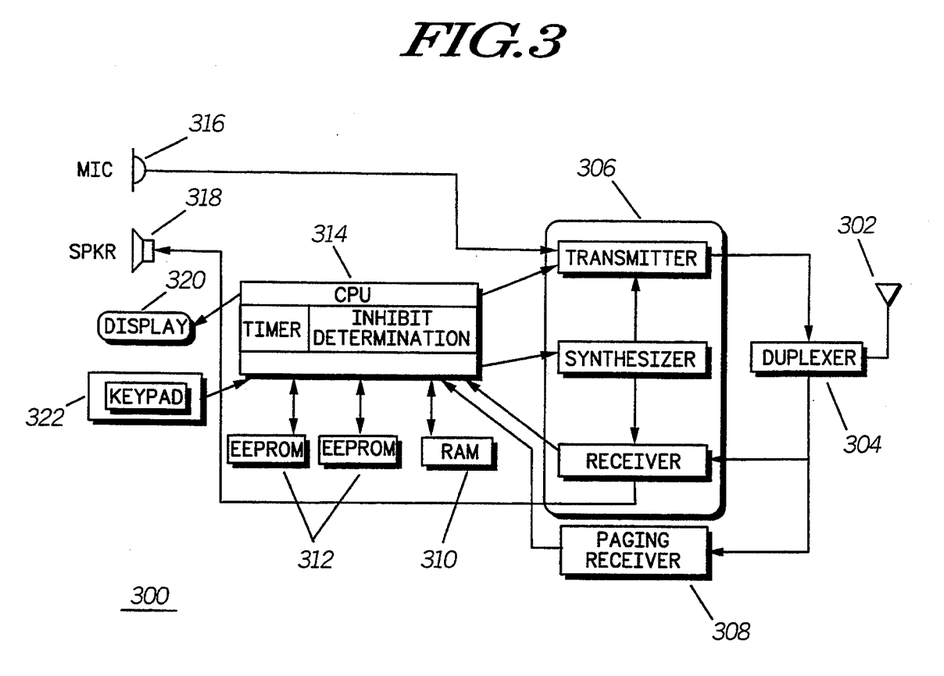
FIG. 3 is a block diagram of a second embodiment of a communication unit in accordance with the present invention.

In FIG. 3, an alternate embodiment of the radio shown in FIG. 2, is shown. Radio 300 instead of using one receiver for both the normal system operation functions and receipt of paging signal functions, uses a separate paging receiver 308 for reception of the system wide paging frequency. Radio 300, also includes a microphone 316, speaker 318, display 320 and keypad 322. Coupled to controller 314 are EEPROM'S 312 and RAM 310. Transceiver portion 306 and paging receiver 308 are coupled to antenna 302 via duplexer 304.

The discussion will now focus on the fixed end infrastructure for the wide area coverage system 100. Since it is the intent of the present invention to have each individual communication system's LAPC 108, 182 and 156 (shown in FIG. 1) decide which local communication system the particular roaming unit should operate on when the communication unit's home system has control information for the unit, the LAPC must have some information to base this on. There are two main sources for this information. One will be the home system, which when it passes along the unit type and call type information to the paging network at the time of the call. This will in turn set the stage for the system requirements information.

For example, the call information might indicate that the roaming communication unit that is going to be paged is a trunking only unit, and the call type is a control transaction since a home based system manager is trying to connect to the communication unit. The IAPC preferably looks into its own database to determine which trunking systems in the communication units area offer control connection service. This leads to the second piece of information that the LAPC needs to make a recommendation on, namely, local system types and their current availability to support various call types.

Figure 4:
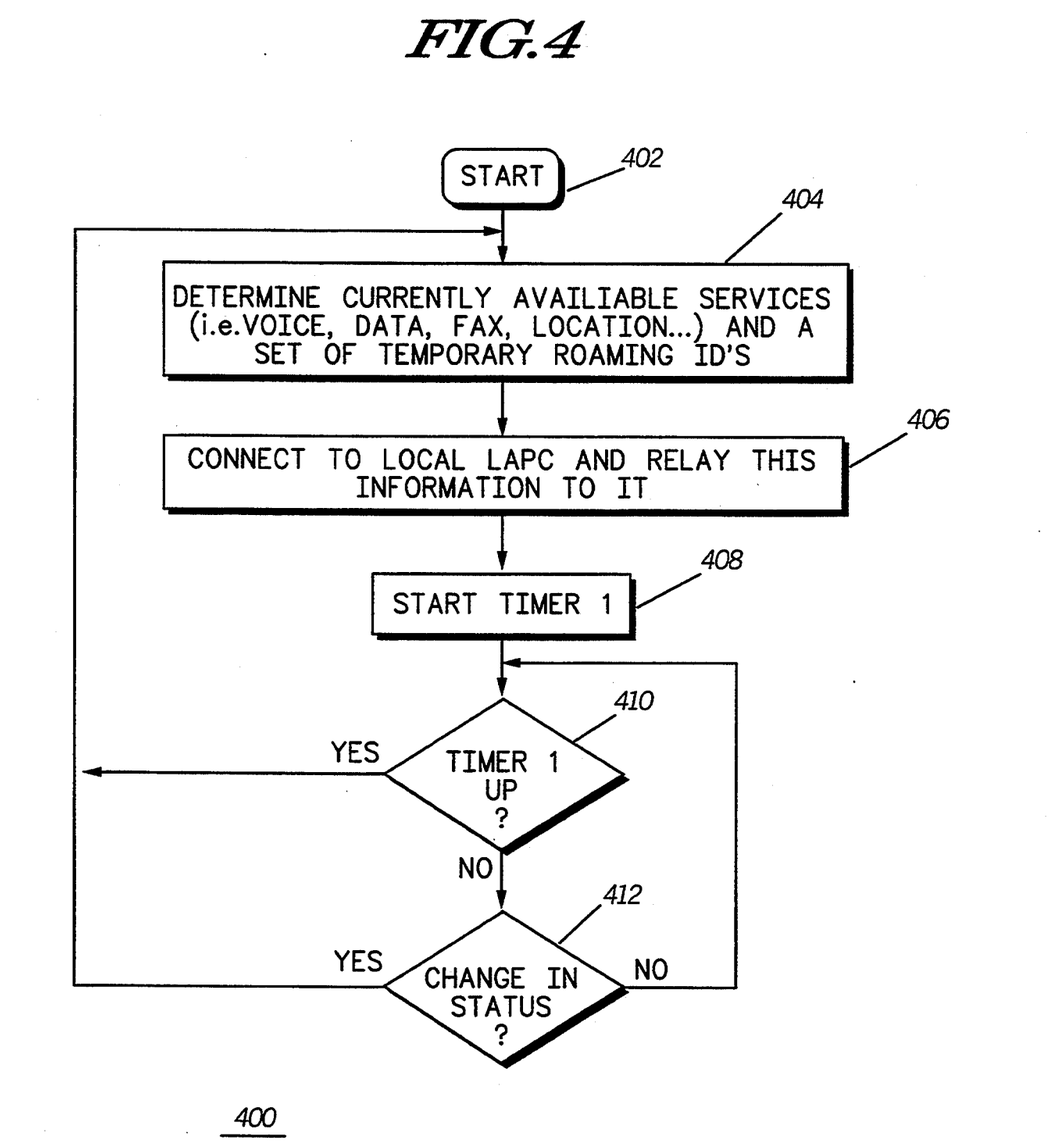
FIG. 4 is a flowchart showing local network service availability reporting in accordance with the present invention.

In FIG. 4, therefor a flowchart shows the steps that a local two-way communication system must carry out in order to provide the above mentioned information to its local LAPC. Firstly, the local system via its sub- system's central controller (e.g., if the local system is sub-system "A" 138, the sub-system controller would be system controller 146) determines its own list of currently available services such as voice, data, fax, etc., in step 404. Also, and especially for trunking systems, the local system may also determine a pool of roaming ID's for the roaming units to temporary use while the units are in the communication system. When these things are determined, the local communication system will connect to the IAPC as shown in step 406, through the PSTN, and send the information into the specific LAPC database. A timer located in the sub-system controllers (controllers 114, 128, 146, and 172) can then be used to refresh the sub-system's corresponding LAPC database on a periodic basis, to insure correct information. In step 408, the timer located in the sub-system controllers is started. In step 410, it is determined if time has run out in the timer. If the timer has run-out in step 410, the routine returns to step 404 where the available services are determined again in order to update the available services information. In step 412, when service availability changes, an update will be offered right away to the units involved.

Figure 5:
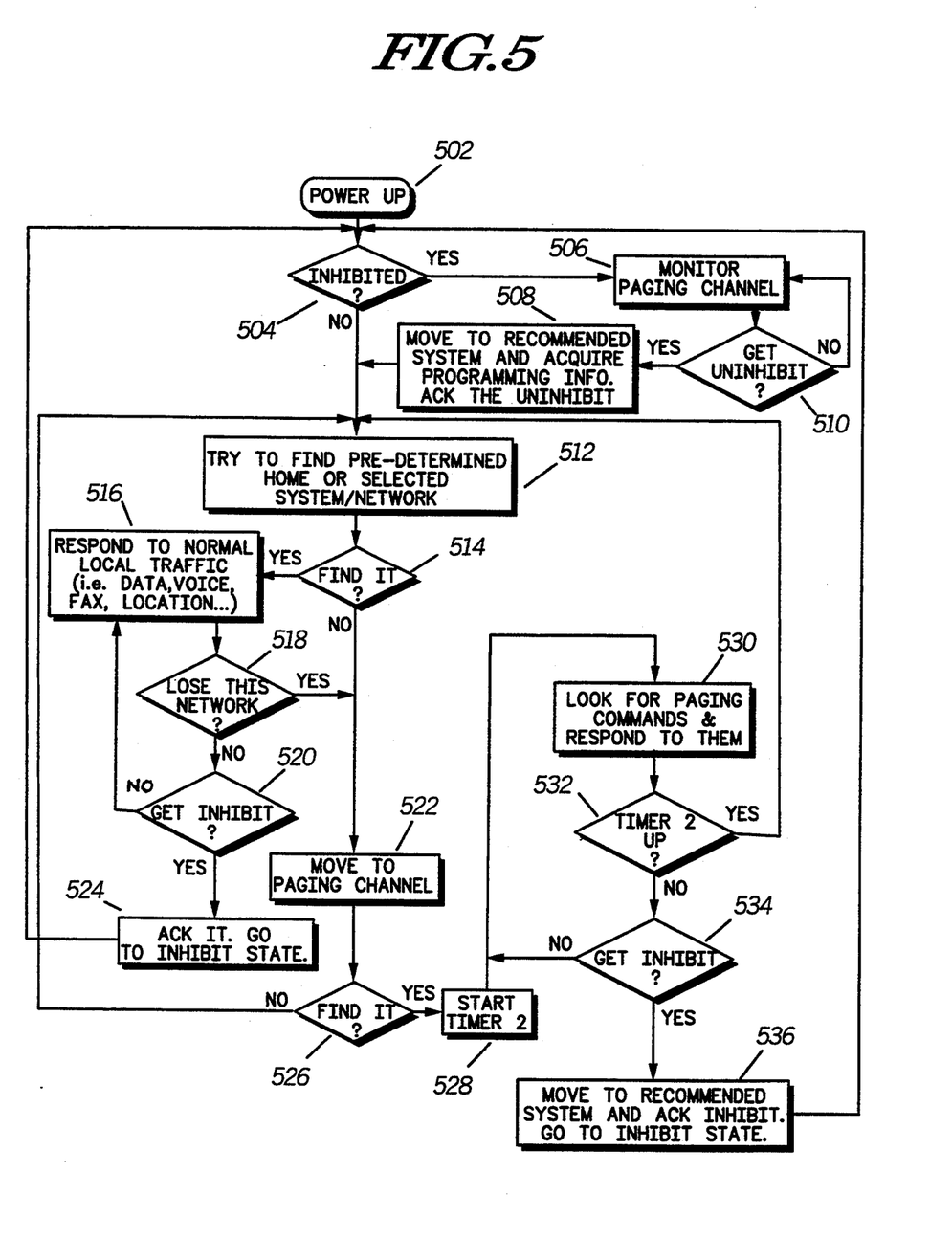
FIG. 5 is a flowchart showing typical communication unit operation in accordance with the invention.

In FIG. 5, a flowchart showing the steps a communication unit takes in order to be able to roam out of its "home system", and still stay in contact with the wide area system are shown. In step 502, the communication unit is turned on. In step 504, the communication unit determines its inhibit state, The inhibit flag can be a variable which is stored in the EEPROM of the communication unit. This allows for the stored inhibit flag variable information not to be lost in case the communication unit is turned off. If the radio is inhibited, such as in the case when the radio is first put into service, or when the communication unit had been previously inhibited, the communication unit will move to the paging channel to wait for an un-inhibit (enable and programming) command, as shown in step 506.

The communication unit in step 510, will then determine if it has received the un-inhibit command. If the communication unit receives its un-inhibit command, the unit moves on to step 508, were it follows the instructions received as to which local system to move to in order for the unit to be able to receive the programming for its new home system. The communication unit need not be within the coverage area of its new home system, since the information can be directed to any local system in order for the unit to gain access back to its home system.

As shown in FIG. 5, the communication unit stays on the paging channel while it is inhibited. This serves two purposes, first it keeps the unit from operating on any system (it can not initiate calls while in this state), and secondly, it can always be enabled no matter where it has roamed. The only command the communication unit will respond to while inhibited, is the uninhibit command while on the paging channel (e.g., the communication unit can not receive any voice, data, etc.).

If the communication unit is not inhibited, after the power-up or un-inhibit sequence just described, the unit will move on to its home system, in step 512. Since in a majority of cases the communication unit begins operation in its home system, it will start with its usual scan routine to try to find its home system first. This may entail searching a pre-stored list of frequencies for a control channel that is broadcasting the specific home system ID that the unit is searching.

If the home system is found in step 514, the communication will remain there, operating in a normal fashion where it may be called to respond to incoming data, voice, location, or facsimile calls shown in step 516. In step 518, the unit keeps checking the integrity of signaling and quality metrics of its home system so that it can judge when it has roamed outside its home system coverage area. While the communication unit is on an operational system, it will look for inhibit commands targeted for it in step 520. If in step 520, the unit is inhibited, in step 524, the inhibit command is acknowledged, after which the communication unit goes into an inhibited state.

Since the communication unit is inhibited, it can not stay in the operational system any longer (e.g., listening to traffic or initiating calls), and it must move to the paging channel as shown in step 506, in case the system manager would want to un-inhibit the communication unit. If in step 518, the communication unit roams outside its home area, and loses the home system, or if the communication unit has powered up outside its home system, the communication unit will attempt to acquire the paging channel, as shown in steps 522 and 526. If the communication unit can not find the paging channel in step 526, the communication unit will once again look for its home system in step 512. If the paging channel is acquired in step 526, as indicated by paging signaling, the communication unit will start a timer in step 528 that will remind the unit to look back for its home system later on. This is shown in step 532, where if the timer set in step 528 has expired, the radio will go back to step 512 in order to look for its home system.

When the communication unit is operating on the paging channel, it will attempt to decode its unique paging channel identification number. Every communication unit will be assigned a unique paging channel ID that will preferably be different than any ID it uses on its home two-way system. In step 530, the communication unit looks for paging commands and responds to them. If the communication unit decodes its ID, it will carry out the command decoded, which can include inhibit commands. The local system may call upon the paging system to find a target unit for an inhibit command, such as shown in step 534 should the home system be unable to find the target unit at home. This is one area where the present invention provides a big improvement over existing systems.

For example, a public safety radio (police radio) being stolen, and transported out of its home area before the system manager were able to initiate a local inhibit command. Without the present invention, the communication unit would still be operational in other areas, and could still be used to monitor sensitive traffic or disrupt authorized communication traffic. The inhibit command on the paging channel of the present invention would more than likely be able to get the stolen radio inhibited. The communication unit would then automatically move to a locally recommended system, as shown in step 536 where it would acknowledge the inhibit command with the inhibiting home system. Thereby, rendering the unit non-operational.

Figure 6:
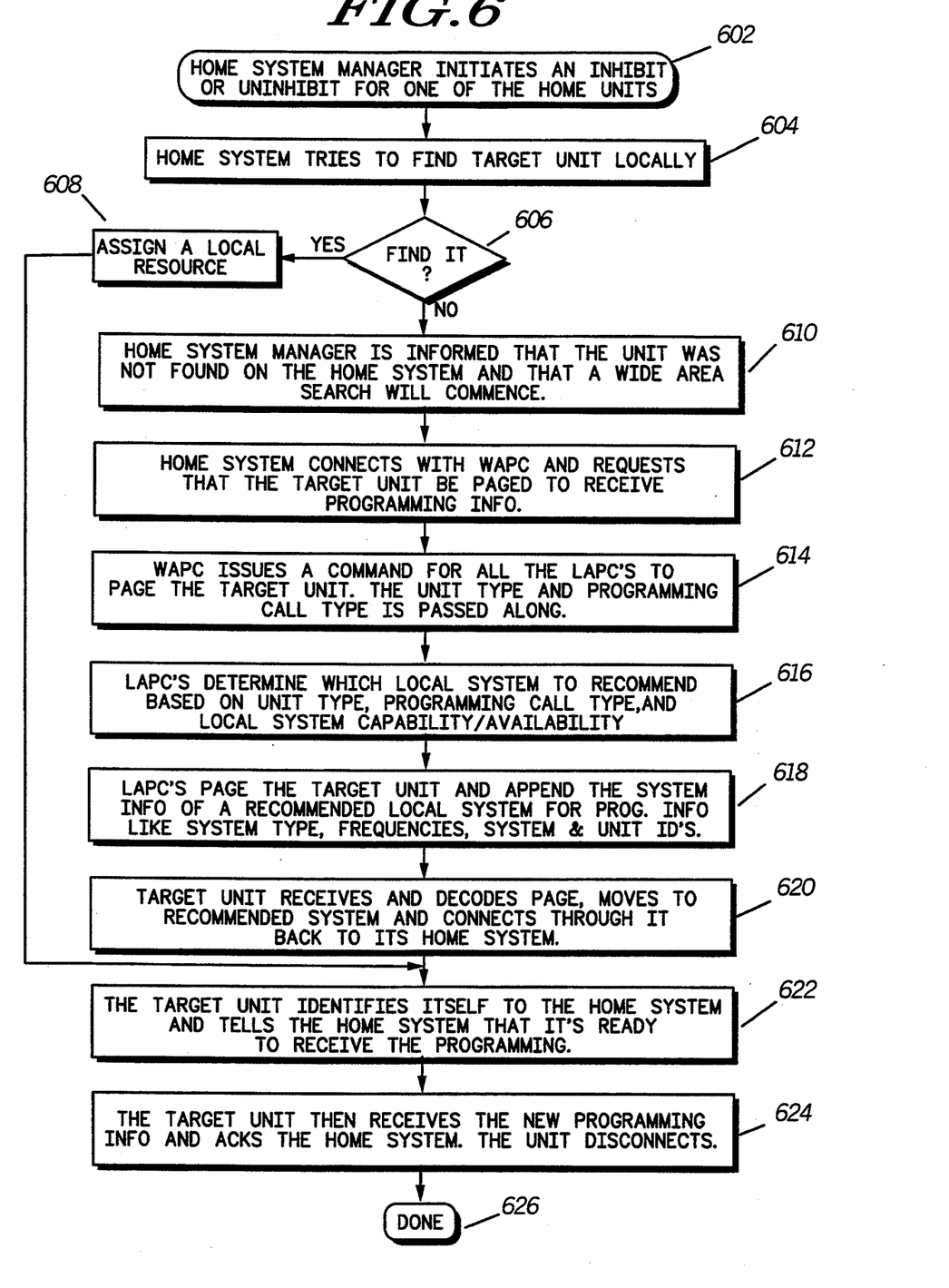
FIG. 6 is a flowchart showing how a communication unit responds to an inhibit or un-inhibit command.

After having discussed the system operation from the communication unit's perspective, the system operation will now be discussed from the system fixed end side. In FIG. 6, a flowchart showing the way system 100 operates in response to an inhibit or un-inhibit request is shown. The intent of the system fixed end is to be able to enable or disable with operating information, a target unit that may be located in its home system or in another area of the wide-area system as the unit roams. The system manager will initiate the commands to the target units as it always does on the unit's home system. The commands will reach the target unit quickly if the unit is in its home system, or the target unit will be paged, in order to force the target unit to connect back to its home system if the unit is roaming. Once paged the unit links up to its home system and receives the command.

At the top of FIG. 6, we being in step 602, with the system manager attempting to inhibit or un-inhibit the target communication unit on the unit's home system. In step 604, the home system attempts to find the unit in the home system. Referring back to FIG. 1, assuming the system manager is computer 124 next to home system B 132, and the target unit is unit X 144 located away from its home system, in system A 156. Home system B 132, will try to find the target unit X 144 in the usual fashion. If the home system is a trunking system, it will likely have unit-to-site registration information and it will know which site to initiate the transaction on, in order to see if the unit is still operational.

In the case where the home system is a cellular system, the system will likely just send a page out on all of its cells to find the unit. In either case, in step 606, the home system will make a determination as to the target unit's location, e.g., at home and turned on, or roaming (or turned off). This transaction will usually take a few seconds to perform, with the time dependent on the complexity of the wide area system. In this specific example, unit X 144 is not home (system B 132) so the "find it" test of step 606 will fail. If the communication unit is found in it's home system, the target unit would be sent over to a home system channel resource, in step 608.

If unit X 144 can't be found in system B 132 (home system), the system will signal the system manager (e.g., located at system controller 128) that the unit was not found at home and that a wide area search will begin as shown in step 610. In step 612, the home system (system B 132) will connect with the WAPC 184, by way of dialing in through its local LAPC (LAPCa 108), to request that unit X 144 be paged. The request will contain the paging system ID of unit X 144, its capability specification, e.g., cellular only, trunked only, cellular and trunked capable etc., and the type of service that is required for the call, for example, a control programming command. In step 614, the WAPC 184 simply echoes this request to all of the LAPC's (LAPCa 108, LAPCb 182 and LAPCc 156).

Next in step 616, each LAPC determines which local system it will recommend should the roamer be found in its area. This is done by each LAPC looking into its own database of local two-way systems, in order to find a system that is compatible with the roamer and that can currently support the service type requested. In the current example, LAPCb 182 will recommend local system A 156, so that unit X 144 can use system A 156 to respond to its inhibit or un-inhibit command.

After the LAPC has determined which system to recommend, it transmits the page, on its transmitter(s), in hopes of alerting the roaming unit in step 618. The page contains the paging system ID of the roamer, the system type of the recommended system, its control access frequencies, its system ID, the call type that the unit is to respond to (e.g., control, and perhaps a roaming ID that the unit can use to call home), and any other required system information.

Receiving the page in step 620, from any one of the paging sites, the roaming unit (unit X 144) will decode the page and "wake up" (come out of its inhibit state). The information field of the page will direct the unit to the recommended system, in this example system A 156 where it will gain access. Gaining access means generating a call request for the control call type specified in the page. Unit X 144 then links to its home system (system B 132), via the PSTN, where it identifies itself by its normal home system ID in step 622. In the present example, unit X 144 gains access to System A 156 where it dials back to its home system B 132.

At this point, the home system and the target unit are connected. If unit X 144 had been in the home system area to start with, it would have been assigned a home system channel resource. If unit X 144 was roaming and dialed back in, we now go forward with the unit informing its home system that it's ready to complete the programming. If the command signal had been an inhibit command, the unit simply would acknowledge the inhibit command and disconnect. If it is an un-inhibit command, the unit must receive programming information from the home system, i.e., system type, system ID, system control frequencies, its new home system individual ID, a group ID for trunking operation, and perhaps other operational parameters. These parameters are preferably stored in the radio unit's non-volatile EEPROM memory (212 in FIG. 2). In step 624, the radio unit acknowledges the programming, after which the unit disconnects with the home system and all of the resources are de-assigned. Preferably, the system manager is also informed that the programming was successful and the routine is completed in step 626.

As been shown by the above description, the present invention solves several problems associated with prior art wide area systems. Some of the major problems solved by the present invention include:

1) Easier control and programming of communication units since a communication unit is capable of gaining access to any system in order to respond to an incoming call.
2) Over-the-air programming of communication units is now feasible for use in wide area systems, since with the present invention, a system user has a higher probability of getting access to roaming radios in the system. The prior issues of either bringing in the radio to the programming service shop, or entering the data directly into the radio, can be eliminated.
3) The present invention solves the registration problems associated with prior art systems, especially unit-to-system registrations. The present invention solves the registration problem by using a separate paging channel to page targeted units, in order to eliminate the registration complexity. The roaming units are also only paged when they are required for a call.
4) In present trunking systems, it is very time consuming for roaming units to link up with a proper system to communicate on, since the roaming radio must scan through many potential control channels to find a good system. Keeping a list of control channel candidates in the roaming radio helps the problem, but adds to the complication of radio unit programming. Radio scanning also wastes a lot of time and causes the roaming unit to be out of communication contact during the time the radio is scanning. The present invention solves this problem by using one predefined paging channel to page roaming units that are targeted for traffic, and directing the units to the appropriate channel resource.
5) Roaming units find it difficult to find a system that provides the services the roaming unit needs for its incoming calls when the unit is away from its home system. Coverage Plus TM systems, for example, broadcast commercial OSW's that announce the services it is currently providing. However, roaming units may have to potentially scan through many systems to find the right one. This new invention solves this problem by directing the targeted unit to a suitable system at the time of the call (no scanning is required on the part of the roaming unit).
6) Presently, communications units that can operate on only one type of system (e.g., cellular only radios, trunking only radios, etc.) can not take advantage of the other system types, even when the other system types could provide the units with better service. On the other hand, multi-service type radios, like radios capable of operating in cellular and trunking systems, are technically possible today, but the efficient use of multiple systems is limited due to the complexity of determining when to use what type of system (e.g., when to use cellular over trunking, etc.). The present invention allows for the ease of use of multi-service communications units, by keeping them constantly in contact through the single paging channel and moving most of the system type determinations to the fixed end side of the system. For example, the best system suitable for use by a roamer could be automatically selected by the system, knowing where the radio is located and who the radio needs to contact.

In summary, the present invention provides for an efficient and quick of way of determining where in a wide area system a roaming radio may be. It also provides information to the roaming unit in order for the unit to "link up" with its home system when required. By overlapping a paging channel over an entire wide area system which can comprise a multitude of smaller systems each being of different types (e.g., cellular, trunking, etc.) a simple and yet very effective way of coordinating the problems associated with roamers is solved.

What is claimed is:

1. A method for establishing communication with a communication device in a communication system including a plurality of operatively interconnected communication sub-systems each having defined coverage areas, the communication system also including a wide area communication system having a communication coverage area which overlaps the communication coverage areas of the plurality of communication sub-systems, one of the plurality of communication subsystems being the communication device's home communication sub-system, the method comprising the steps of:

initiating a call message to the communication device;

determining if the communication device is located in the communication device's home communication sub-system;

determining at the wide area system which of the communication sub-systems to recommend to be used by the communication unit considering the type of call message that is being sent to the communication device and the communication device's capabilities;

transmitting a message over the wide area system directed to the communication device if the communication device cannot be found in the communication device's home communication sub-system;

receiving the wide area system message at the communication device; and switching the communication device to operate in a communication sub-system directed by the wide area system message.

2. A method as defined in claim 1, wherein the step of transmitting a wide area system message comprises paging the communication device.

3. A method as defined in claim 1, further comprising the step of:

establishing a communication link between the communication sub-system the communication device was directed to and the home communication sub-system in order for the communication device to be able to receive the call message.

4. A method for establishing communication with a communication device in a communication system including a plurality of operatively interconnected communication sub-systems each having defined coverage areas, the communication system also including a wide area communication system having a communication coverage area which overlaps the communication coverage areas of the plurality of communication sub-systems, one of the plurality of communication sub-systems being the communication device's home communication sub-system, the method comprising the steps of;

initiating a call message to the communication device:

determining if the communication device is located in the communication device's home communication sub-system:

transmitting a message over the wide area system directed to the communication device if the communication device cannot be found in the communication device's home communication sub-system;

receiving the wide area system message at the communication device:

switching the communication device to operate in a communication sub-system directed by the wide area system message:

establishing a communication link between the communication sub-system the communication device was directed to and the home communication sub-system in order for the communication device to be able to receive the call message;

sending a message from the local communication sub-system to the wide area system, the message comprising information regarding the type of call message that is being sent to the communication device and the communication device's capabilities; and determining at the wide area system which of the communication subsystems to recommend to be used by the communication unit considering the type of call message that is being sent to the communication device and the communication device's capabilities.

5. A communication device capable of operating in a communication system having a plurality of communication sub-systems and a wide area communication system overlapping the plurality of communication sub-systems, one of the plurality of communication subsystems being the communication device's home sub-system, the communication device comprising:

receiver means for receiving information messages and for monitoring the wide area communication system;

means coupled to the receiver means for determining if the communication device is located within its home sub-system and for providing a control signal if it is determined that the communication device is not located in the home sub-system, the receiver means monitors the wide area system in response to the control signal;

decoding means coupled to the monitoring means for decoding a message from the wide area communication system, the decoded message informing the communication device which communication sub-system from among the plurality of communication sub-systems to use, based on the type of call message that is being sent to the communication device and the communication device's capabilities, to establish a communication link with the home sub-system; and controller means coupled to the decoding means for placing the receiver means in condition to receive the information message.

6. A communication device as defined in claim 5, further comprising:

a timer means responsive to the control signal for generating a timer signal which causes the receiver means to attempt to receive information from the home communication subsystem.

7. A communication device as defined in claim 5, wherein the controller means further comprises an inhibit determination means for determining if the communication device has received an inhibit command at the receiver means.

8. A communication device as defined in claim 6, wherein the receiver means comprises a first receiver section for monitoring the plurality of communication sub-systems and a pager section for monitoring the wide area communication system.

9. A communication system providing roaming capabilities to a communication device, comprising:

a plurality of operatively interconnected communication sub-systems each having a defined coverage area, one of the plurality of communication sub-systems serving as the communication device's home sub-system;

a wide area paging system operatively coupled to the plurality of sub-systems, the wide area paging system having a communication coverage area which overlaps the coverage areas formed by the plurality of communication sub-systems, the wide area paging system including a wide area controller and a plurality of local area controllers coupled to the wide area controller;

the home communication sub-system further comprising a sub-system controller for determining if the communication device is located within the home sub-system and for generating a message to the wide area system when it is determined that the communication device is not in its home sub-system; and the wide area paging system further comprising a means responsive to the home sub-system message for generating a wide area message which directs the communication device to one of the plurality of communication sub-systems, considering the type of call message that is being sent to the communications device and the communication device's capabilities, in order for the communication device to establish a communication link with the home communication sub-system.

10. A communication system as defined in claim 9, wherein the plurality of local area controllers comprise a plurality of local paging systems each including a local area paging controller.

11. A communication system as defined in claim 10, wherein the plurality of local paging systems each have a communication coverage area which overlaps at least one communication sub-system coverage area and each of the local area paging controllers select from among the plurality of communication sub-systems the one communication sub-system from among the plurality of communication sub-systems that is to be used to establish a communication link to the communication unit's home communication sub-system.

12. A communication system as defined in claim 11, wherein the plurality of communication sub-systems are interconnected to each other via the public switched telephone network.

13. A communication system as defined in claim 11, wherein each of the local paging systems transmit as part of the wide area message to the communication device information regarding which communication sub-system within their respective coverage area to be used to link with the home communication sub-system.

* * * * *

UNITED STATES PATENT AND TRADEMARK OFFICE
CERTIFICATE OF CORRECTION

PATENT NO. : 5,357,561

DATED : October 18, 1994

INVENTOR(S) : Gary W. Grube

It is certified that error appears in the above-identified patent and that said Letters Patent is hereby corrected as shown below:

In Column 12, line 43, claim 7, after the word "means" please insert --informing the receiver means to monitor the wide area system in response to the reception of the inhibit command.--

Signed and Sealed this

Twenty-second Day of August, 1995

Attest:

BRUCE LEHMAN

Attesting Officer     Commissioner of Patents and Trademarks